United States Patent [19]
Roselli

[11] 3,815,269
[45] June 11, 1974

[54] SLIDE CALCULATOR FOR DETERMINING SELECTED PERIODS OF TIME

[76] Inventor: Susan J. Roselli, Via Oglio, 00198, Rome, Italy

[22] Filed: Nov. 30, 1972

[21] Appl. No.: 310,715

[30] Foreign Application Priority Data
Dec. 1, 1971 Italy .................................. 54443/71
Jan. 24, 1972 Italy .................................. 47913/72

[52] U.S. Cl. .................................. 40/110, 35/24 B
[51] Int. Cl. .................................. G09d 1/00
[58] Field of Search ...... 40/109, 110, 118; 35/24 C, 35/24 B, 31 R, 31 E; 235/86, 89, 71

[56] References Cited
UNITED STATES PATENTS

| | | | |
|---|---|---|---|
| 381,425 | 4/1888 | Rosenwasser et al. | 40/109 X |
| 1,203,386 | 10/1916 | Murray | 40/110 |
| 3,365,819 | 1/1968 | Connell | 35/77 |
| 3,603,005 | 9/1971 | Dysart | 235/89 R |

FOREIGN PATENTS OR APPLICATIONS

| | | | |
|---|---|---|---|
| 321,573 | 11/1929 | Great Britain | 40/110 |
| 1,083,188 | 6/1954 | France | 35/31 |
| 1,402,151 | 5/1965 | France | 40/110 |

Primary Examiner—Robert W. Michell
Assistant Examiner—J. H. Wolfe
Attorney, Agent, or Firm—Robert E. Burns; Emmanuel J. Lobato; Bruce L. Adams

[57] ABSTRACT

A slide calculator particularly for determining the expiration dates of selected periods of time comprises a flat rectangular body having a calendar of particular configuration on at least one face and a traveler in the form of a flexible belt of transparent material which encircles the body. The belt carries one or more indices representing the start of a selected period and also one or more indices indicating the end of the period selected. The belt is slidable linearly on the body and, by reason of its flexibility, is also movable in a rotational direction. When the belt is moved so as to bring the index representing the start of a selected period into registry with a selected date of the calendar on the body, the index on the belt representing the end of the selected period coincides with the corresponding date on the calendar. In order to determine periods of different lengths the traveler is provided with indices of different shapes or colors for the respective periods.

9 Claims, 4 Drawing Figures

FIG. 3

SPECIAL FARES

FIG. 2

XYZ AIRLINE

SLIDE CALCULATOR FOR DETERMINING SELECTED PERIODS OF TIME

FIELD OF THE INVENTION

The present invention relates to sliding calculators and particular to calculators for determining the expiration dates of selected periods of time.

BACKGROUND OF THE INVENTION

In various businesses and professions it is necessary to determine the expiration dates of selected periods of time. For example, in the travel business special rates are given for trips having a duration not less than a minimum number of days and not more than a maximum number of days. Moreover, there is an additional charge for traveling on weekends and a fare differential according to the season.

The calculation of selected periods of time is also necessary in other fields, for example in banking and in the legal profession. In banking and credit operations, loans are frequently made for short terms. In the legal profession it is necessary to determine accurately the dates for replying to complaints, bringing motions and taking other actions.

At present the calculation of periods of time is commonly done mentally with the help of a calendar. However, this is a time consuming operation and mistakes are frequently made. In making airline bookings, the airline personnel frequently have to work under pressure because of waiting customers. The present inefficient mode of making such calculations results in delay and in customer dissatisfaction and also in losses to the airline when mistakes are made in figuring the proper tariffs applicable to the departure and return dates selected by the customer.

SUMMARY OF THE INVENTION

It is an object of the present invention to remove the difficulties and inconveniences which have heretofore been encountered in making a rapid and accurate determination of the termination dates of selected periods of time. In accordance with the invention the beginning and end of selected periods can be determined quickly and accurately. Moreover, with respect to the determination of appropriate air fares, it can be seen at a glance whether the departure date or the return date falls on a weekend (requiring an additional payment) or whether the departure or return falls in a peak season requiring a surcharge. With the slide calculator in accordance with the invention the beginning and end of a selected period can be quickly and accurately ascertained even though the period overlaps two or more months or falls in two successive years.

The slide calculator in accordance with the present invention comprises a rectangular flat body having opposite faces on at least one of which there are indicia representing a calendar. A traveler comprising a flexible band of transparent material encircles the body. The traveler is slidable rectilinearly along the body and also rotationally around the body, thus being capable of bidirectional movement. The traveler carries index means representing the starting date of a selected period and also index means indicating the end of the period selected. The geometry of the calendar on the body and the index means on the traveler are selected so that when the traveler is moved relative to the body to bring the starting index into registry with the starting date of the selected period, the termination index on the carrier will register with and thereby indicate on the calendar the termination date of the period selected. Moreover, for use in air travel where there are maximum and minimum periods for which special rates are available, the traveler is provided with two termination indices, one representing the end of the minimum term and the other the end of the maximum term. The same traveler can be used for calculating different periods of time either by having indices of different shapes or colors for the different periods or by identifying the periods numerically on the indices. The calendar is also preferably provided with indications of weekends and of seasons of the year subject to different fares so that the appropriate fare for a proposed trip can readily be determined.

BRIEF DESCRIPTION OF DRAWINGS

The objects, characteristics and advantages of the present invention will be readily understood from the following description of preferred embodiments shown by way of example in the accompanying drawings in which:

FIG. 2 is a view similar to FIG. 1 but showing the traveler of the slide calculator in a different position;

FIG. 3 is a view of the reverse side of the calculator body shown in FIGS. 1 and 2 but with a different traveler.

DETAILED DESCRIPTION OF PREFERRED EMBODIMENTS

Figure 1:
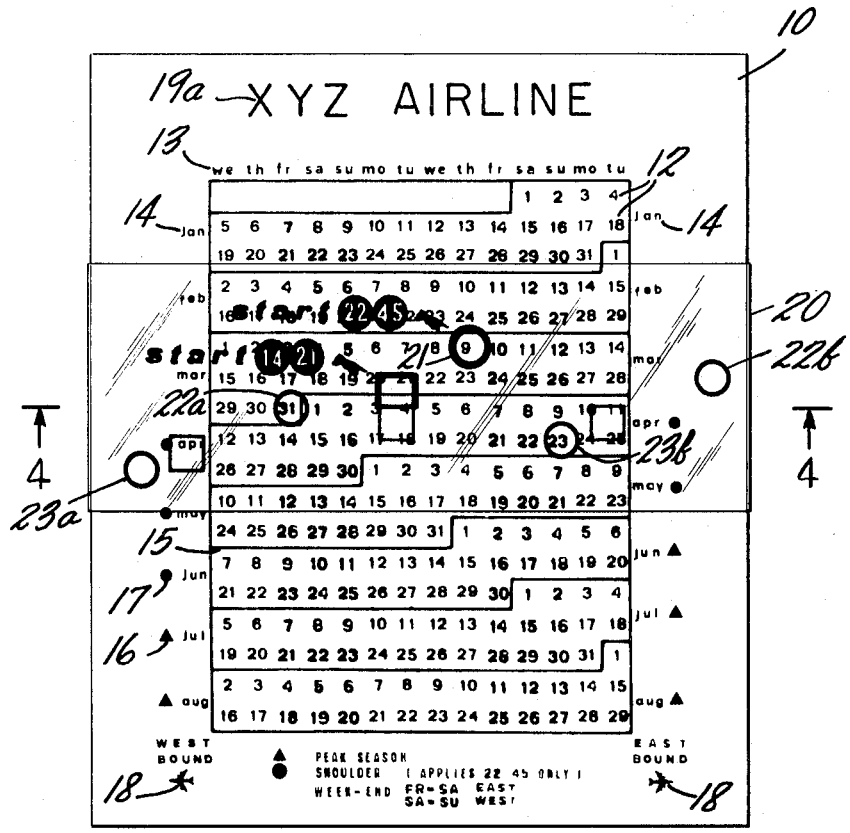
FIG. 1 is a front view of a slide calculator in accordance with the present invention designed particularly for use by airlines and travel agencies.

In the drawings there is shown by way of example a slide calculator designed particularly for use by airlines and travel agencies for determining departure and return dates for periods for which special fares are available. The calculator is shown as comprising a body portion 10 and a traveler or slide 20. The body 10 is shown as being of rectangular shape with opposite parallel faces and with rounded opposite edges 11. The body can be of any suitable material which is dimensionally stable and durable and which will readily receive and retain printing. For example, the body can be of cardboard or plastic or of a laminated material comprising superposed layers of which at least the outer layers present smooth, attractive and durable surfaces. The body is made of a convenient size for use. By way of example, the body may be approximately 3 inches wide, 4 inches long and one-eighth inch thick.

Figures 2, 3:
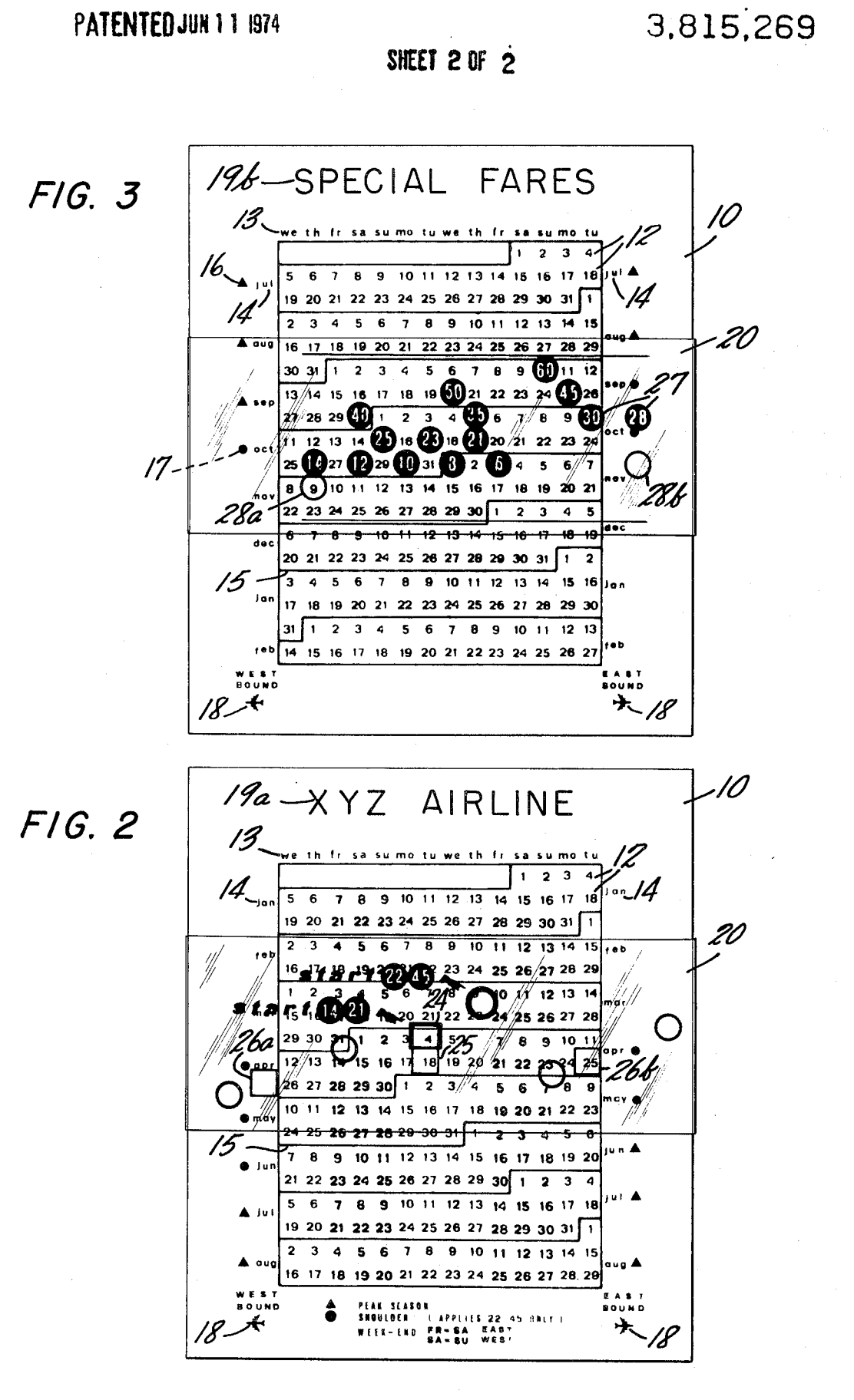

On at least one face of the calendar there are numbers 12 arranged to represent a calendar. In the embodiment shown in the drawings the numbers are arranged in fourteen equally spaced vertical columns so that each horizontal row represents a period of two weeks. The days of the week are indicated by abbreviations 13 appearing at the top of the vertical columns. The numbers representing the dates falling on Friday, Saturday and Sunday of each week are distinguished from other days for example by being printed in a different color or a different type style. The dates on which weekend surcharges are applicable are thereby readily determinable. The calendar is so arranged that the months follow one another successively. The months are indicated by abbreviations 14 appearing in right and left hand margins. Successive months are divided from one another by transversely extending lines 15. In the illustrated embodiment, the months of January through August appear on the front face (FIG. 1) of the body while the months of July through February of the following year appear on the back face (FIG. 3). As will appear from the following description, this repetition of the months of July and August and of January and February makes it possible to calculate periods overlapping the midyear and the year end.

In the side margins there are also provided triangular indicia 16 which are referenced to a legend in the bottom margin and indicate peak seasons in which higher fares are applicable. There are also provided round indicia 17 which are likewise referenced to a legend in the lower margin and indicate "shoulder" or transition periods between peak season and off season. Airplane shaped indicia 18 and accompanying legends provided at the bottoms of the side margins indicate direction of travel in which the fare schedules indicated by the indicia 16 and 17 apply. Appropriate legends 19a and 19b may be provided at the top of the body portion for example to indicate the name of the airline and that special fares are available for travel periods indicated by the calculator.

Figure 4:
FIG. 4 is a cross section taken approximately on the line 4—4 in FIG. 1.

The traveler or slide 20 comprises a belt or band of flexible transparent material, for example an endless band of flexible transparent plastic. As seen in FIG. 4, the traveler 20 encircles the body 10 snugly so as to be readily slidable thereon and yet retained frictionally in any position to which it is moved. The band 20 is slidable lengthwise of the body and, by reason of its flexibility, can also be moved circumferentially, thus being capable of bidirectional movement. By reason of the body 10 having appreciable thickness and having rounded edges 11, the band 20 extends around the edges of the body without creasing or folding and lies flat against the opposite faces of the body. The width of the band 20 (in a direction lengthwise of the body) is sufficient to provide for the maximum period of time that is to be calculated. In a calculator of the proportions illustrated in the drawings the width of the band 20 is about one-fourth to one-third the length of the body 10.

The band 20 carries an index 21 which is shown in the form of a circle and is identified by the notation "start 22 45." This represents the starting index for a period having a minimum length of 22 days and a maximum length of 45 days. Thus, to be entitled to the special fare provided for this period, a passenger departing on a selected date must return not earlier than the 22nd day and not later than the 45th day from the starting date. The carrier is further provided with indices 22a and 22b which are so positioned with respect to the "start" index 21 that when the index 21 is placed in registry with a selected starting date on the calendar, either index 22a or index 22b will register with the earliest permissible return date, i.e. 22 days after the starting date. The two indices 22a and 22b are spaced laterally apart a distance equal to fifteen unit columns of the calendar appearing on the face of the body 10 so that when one of the indices 22a or 22b is on the calendar area the other will be off. Thus, in the position of the band 20 shown in FIG. 1 with the "start" index 21 in registry with the date of Mar. 9, the index 22a is in registry with Mar. 31, i.e., 22 days later, and the index 22b is in the margin. If the band 20 were to be moved to the left to bring the "start" index 21 into registry with March 6, the index 22b would register with Mar. 28 and the index 22a would be in the left hand margin. Hence, the end date of the period is indicated either by index 22a or index 22b. The band 20 is further provided with indices 23a and 23b which are likewise of circular form and represent the end of the maximum period, i.e., a date 45 days after the starting date in the illustrated example. As in the case of indices 22a and 22b, the two indices 23a and 23b are spaced apart laterally so that one is on the calendar area when the other is off. Thus, one or the other of the two indices 23a and 23b is on the calendar area regardless of the position to which the "start" index 21 is set. In the position of the traveler illustrated in FIG. 1 with the "start" index on Mar. 9, the end index 23b registers with the date of Apr. 23 thereby indicating the end of the maximum period of 45 days. The other terminal index 23a is in the left hand margin.

The traveler band 20 further carries an index 24 in the form of a square identified by the legend "start 14 21." The index 24 is used as indicated in FIG. 2 to mark the start of a period having a minimum duration of 14 days and a maximum duration of 21 days. An index 25 in the form of a square directly below the index 24 indicates the end of the minimum 14 day period. Since there are 14 days in each horizontal line of the calendar, the index 25 is directly below and adjacent to the index 24. Because of this relationship only a single end index 25 is needed. There are, however, two indices 26a and 26b in the form of square indicating the end of the maximum 21 day period. As in the case of indices 23a and 23b, the indices 26a and 26b are spaced apart laterally so that one or the other is on the calendar area whatever the position of the "start" index 24. In the position of the traveler illustrated in FIG. 2 with the "start" index 24 on Apr. 4, the terminal index 25 registers with the date of Apr. 18 representing the end of the minimum 14 day period and the terminal index 26b registers with the date of Apr. 25 indicating the end of the maximum 21 day period. As the indices for the 22-45 day period are round while the indices for the 14-21 day period are square, there is no danger of confusing the indices for the different periods. It will be understood that still other shapes can be used or that the indices can be differentiated by colors. Moreover, as will be seen by comparing FIGS. 1 and 2, the two sets of indices are so arranged that when one set is in registry with dates on the calendar the other is out of registry. Thus, in FIG. 1 the circular indices 21, 22a and 23b register with calendar dates while the square indices are out of registry. Conversely when the square indices are in registry with numbers on the calendar as shown in FIG. 2, the circular indices are out of registry. There is hence no danger of reading the wrong date. The indices on the traveler band can be formed appropriately, for example by punching holes in the band or by printing or embossing the indices on the band. If the indices are in the form of holes it is desirable to have the edges of the holes outlined with black or other color so that the holes can more easily be seen. Alternatively, the band 20 can be tinted in an appropriate color different from the surface of the body 10 so that the holes representing the indices are readily apparent by color contrast.

In FIG. 3 there is shown a traveler band 20 having a different arrangement of indices for determining the terminal dates of periods of different length. There are shown by way of example 15 starting indices marked respectively 60, 50, 45, 40, 35, 30, 28, 25, 23, 21, 14, 12, 10, 8 and 6. There are two terminal indices 28a and 28b which, as described above, are arranged so that one or the other is on the calendar area. In order to determine the date of termination of a selected period, the "start" index for that period is brought into registry with the starting date of the period. The terminal date of the period is then read either in the index 28a or in the index 28b whichever is on the calendar area. Thus, in the position of the traveler illustrated in FIG. 2 with the start index for a 50 day term set on the date of Sept. 20, the index 28a registers with the date of Nov. 9 indicating the end of the 50 day period. The termination dates of other periods can be determined in like manner. Indices as illustrated in FIG. 3 can be formed on the other half of the traveler band 20 shown in FIG. 1 or on a separate traveler band. It will be understood that the traveler bands can be slipped on and off of the body 10 so as to be readily interchangeable with one another. Hence, traveler bands with different index arrangement for different periods are readily provided.

The mode of operation of a slide calculator in accordance with the invention will be readily understood from the foregoing description. With the traveler 20 shown in FIGS. 1 and 2, the earliest and latest return dates for a 22–45 day period are determined by setting the start index 21 on the date of departure and reading the earliest permissible return date for the minimum term in index 22a or 22b and the latest return date for the maximum term in index 23a or 23b, whichever is on the calendar area. The earliest and latest return dates for a 14–21 day period are determined in like manner by setting the "start" index on the departure date and reading the earliest return date for the minimum period in the index 25 and the latest permissible return date for the maximum period in index 26a or 26b. With the traveler shown in FIG. 3, terminal date of a selected period is determined by setting the "start" index for that period on the date of the beginning of the period and then reading the terminal date of the period in the index 28a or 28b. It will be understood that the traveler band 20 can be moved circumferentially so as to bring the indices into registry with the calendar on either face of the body. As the calendars on opposite sides of the body have an overlap or repetition at least as great as the maximum term to be calculated, the desired term can always be determined by using the appropriate side of the body. For example, with reference to FIG. 1 if the traveler is moved downwardly so that some of the indices come below the calendar area, the card is turned over so as to use the other side. Since the reverse side of the body includes the months of Jan. and Feb. of the following year, periods overlapping the end of the year can be determined without difficulty.

By using a slide calculator in accordance with the present invention the following advantages are obtained:

1. Considerable saving in time in operations relating to the tourist industry which is of particular importance in peak periods such as rush hours in travel agencies and check-in operations at airports and terminals.

2. The complete elimination of financial loss resulting from errors of calculation or failure to carry out required verifications due to lack of time. With the slide calculator of the present invention, it can be seen at a glance whether the departure and return dates requested by a passenger come within the terms qualifying him for a special fare and whether departure and return dates are on the weekends or in a peak season requiring a surcharge.

3. The slide calculator in accordance with the present invention is inexpensive to manufacture and is small in size and convenient to use so that all personnel can be provided with an accurate and efficient means of calculation.

4. In addition to its use for calculating periods of time, the device in accordance with the present invention provides a convenient calendar usable for all purposes.

While preferred embodiments of the invention have been shown by way of example in the drawings and are herein particularly described, it will be understood that the invention is in no way limited to the details of construction of these embodiments.

What I claim and desire to secure by Letters Patent is:

1. A slide calculator for determining expiration dates of selected periods of time, comprising an elongated rectangular flat body having opposite faces, indicia on at least one of said faces of said body representing a single non-repetitive calendar, said indicia comprising successive transverse rows of successive numbers representing consecutive days of successive months, traveler means comprising a flexible band of transparent material encircling said body and slidable along said body in a direction lengthwise of the body and also rotationally around said body, and index means on said traveler, means comprising a first index registrable with one of said indicia on said body representing the starting date of a predetermined period by sliding said traveler means bidirectionally relative to said body, a second index positioned relative to said first index and said indicia to thereupon register with and thereby indicate the termination date of said predetermined period and a third index also for indicating the end of said predetermined period, said second and third indices being positioned apart in a distance equal to one row plus the prorata space for one additional number in said one row so that when one of said second or third indices is on a number in one of said rows the other of said indices is beyond an end of said rows of numbers, whereby the termination date of the predetermined period is read from whichever of said second or third indices is on a number in a row of numbers.

2. A slide calculator according to claim 1, in which opposite edges of said body over which said traveler means extends are rounded.

3. A slide calculator according to claim 1, in which said index means on said traveler means further comprises fourth and fifth indices, said second and third indices being positioned to indicate a minimum predetermined period and said fourth and fifth indices being positioned to indicate in like manner the end of a maximum predetermined period.

4. A slide calculator according to claim 1, in which said index means on said traveler means further comprises fourth, fifth and sixth indices positioned to indicate in like manner the beginning and end of a second predetermined period, said first, second and third indices comprising symbols of a first shape and said fourth, fifth and sixth indices comprising symbols of a second shape which is different from said first shape.

5. A slide calculator according to claim 3, in which said index means on said traveler means comprises said first, second, third, fourth and fifth indices comprising symbols of a first shape and sixth, seventh and eighth indices comprising symbols of a second shape different from said first shape, said sixth, seventh and eighth indices being positioned to indicate in like manner the starting date and the end of a second predetermined period.

6. A slide calculator according to claim 1, in which said indicia on said body comprise fourteen numbers in each of said rows.

7. A slide calculator according to claim 6, in which said indicia on said body further comprise month indications in side margins of said body and in which lines divide each month from adjacent months.

8. A slide calculator according to claim 6, in which said second and third indices are positioned apart a distance equal to fifteen numbers on said body so that when one of said second and third indices is on a number in one of said rows the other is beyond an end of said rows of numbers, whereby the termination date of the predetermined period is read from whichever of said second and third indices is on a number in a row of numbers.

9. A slide calculator according to claim 1, in which said index means on said traveler means comprises a plurality of indices each indicating the start of a period of selected length with means for indicating the length of the respective period and two indices for indicating the end of the predetermined period, said two end indicating indices being positioned so that when one registers with one of the indicia on said body, the other is beyond the area of said body occupied by said indicia.

* * * * *